April 8, 1941. C. M. ASHLEY Re. 21,761

AIR CONDITIONING SYSTEM FOR VEHICLES EMPLOYING STEAM EJECTORS

Original Filed Aug. 12, 1932 2 Sheets-Sheet 1

INVENTOR.
CARLYLE M. ASHLEY
BY
ATTORNEY

April 8, 1941. C. M. ASHLEY Re. 21,761

AIR CONDITIONING SYSTEM FOR VEHICLES EMPLOYING STEAM EJECTORS

Original Filed Aug. 12, 1932 2 Sheets-Sheet 2

INVENTOR.
CARLYLE M. ASHLEY
BY Herman Seid
ATTORNEY

Reissued Apr. 8, 1941 Re. 21,761

UNITED STATES PATENT OFFICE 21,761

AIR CONDITIONING SYSTEM FOR VEHICLES EMPLOYING STEAM EJECTORS

Carlyle M. Ashley, Summit, N. J., assignor, by mesne assignments, to Carrier Corporation, Newark, N. J., a corporation of Delaware Original No. 2,081,905, dated June 1, 1937, Serial No. 629,177, August 12, 1932. Application for reissue June 23, 1937, Serial No. 149,919

20 Claims. (Cl. 62—6)

This invention relates to air conditioning systems for passenger cars, and more particularly, to methods of and means for controlling the temperature and relative humidity of a car enclosure by a combination of apparatus using steam for producing desired refrigeration effect.

The general object of the invention is to condition the atmosphere of a series of cars of a train by utilizing a steam supply from a central source. The steam supply may be primarily employed for purposes other than the production of desired refrigeration effect for air conditioning purposes, and ordinarily its chief purpose will be for driving locomotive and steam auxiliaries. The pressure of the steam supply will, therefore, vary, depending upon the character of the boiler, as well as the demands of the locomotive to be driven, without regard to the relatively lower pressures required for producing refrigeration effect in car conditioning systems remote from the locomotive.

A further object is to arrange for distributing steam from a central source to a plurality of points remote from said source, the pressure of the steam at each of said points differing from each other and from the pressure at the source.

The refrigeration effect resulting from the use of steam at each of said points will, however, be substantially the same at each of the cars, or may vary, as desired, so that for different purposes, some cars of the same train may be afforded greater refrigeration effect than will be afforded to other cars in the train.

A further object of the invention is to afford a system of regulation in combination with an air conditioning apparatus for a passenger car adapted to control the temperature and relative humidity of air within the car responsive to changes in heat load affecting the atmosphere of the car. The control of outdoor air volumes and return air volumes, as well as the continued circulation of desired quantities of air at predetermined temperatures and dewpoints is afforded under manual and automatic control, so that, in fact, weather may be manufactured at will to suit varying needs or tastes; and may also be so regulated that equable and constant conditions may be produced and maintained throughout the car area, regardless of variation in climatic conditions outside the car.

Another object is to provide refrigeration equipment which does not require the use of a refrigerant other than water. The employment of water in liquid and vaporous form is caused to produce desired refrigeration and dehumidification effect in the conditioning of car interiors. Due to the safety of water over refrigerants, such as ammonia, for example, no hazards are invited, nor are passengers exposed to injury from the effect of a dangerous refrigerant as might readily occur in the event of leakage or train wreck. It is obvious that water is always universally available and is generally inexpensive, so that the system may be readily replenished, with very little trouble.

A feature of the invention resides in the provision of an evaporator for cooling a supply of liquid for conditioning a railroad car, and supplying steam to an ejector serving the evaporator at desired pressure, regardless of the pressure of the steam supplied to the car wherein the evaporator is located.

Another feature provides for the operation of an evaporator when steam is supplied to an ejector in combination therewith at a desired pressure, and for cutting off the steam to the ejector when the pressure thereof falls below a predetermined limit.

Another feature provides for supplying steam to an ejector nozzle for causing evaporation to take place in an evaporator, said steam being adapted to entrain vapor from the evaporator and discharge within a condenser. This feature embraces the use of a common passage connecting the evaporator and condenser, within which the steam is discharged.

A further feature resides in the provision of a combination cooling tower and condenser, having means for spraying water over the condenser to maintain its surface in a wetted condition, and means for intaking a volume of air at one side of the car and discharging it at the other side or through the top in such manner as to dissipate the heat resulting from condensation of vapors within the condenser.

Another feature provides means for collecting air and excess condensate within the condenser and means for supplying liquid to the surface of the condenser in such a manner as to cause the liquid to entrain and discharge the air and excess condensate substantially at atmospheric pressure.

Another feature provides a plurality of closed water circuits, water from one of said circuits being subject to evaporation, said evaporated water being delivered to another of the circuits after passing through the condenser.

Another feature resides in the provision of an evaporator in one water circuit, the provision of a condenser in another water circuit, and shifting liquid from one circuit to the other circuit while maintaining desired water level in the evaporator.

Another feature provides a series of closed fluid circuits in an air conditioning system, one of said circuits including an evaporator, another of the circuits including a condenser, and a third of the circuits including both the evaporator and condenser.

Another feature governs the operation of a pumping device for supplying water to a condenser, the pumping device being operative only when steam is supplied to an ejector for causing evaporation in an associated evaporator.

Still another feature governs the supply of steam to an ejector only when atmospheric conditions within a car are beyond predetermined temperature limits.

Another feature provides the combination of a pump for supplying water to a condenser and a fan for causing circulation of air to cool said water, the pump and fan being arranged to operate only when atmospheric conditions in an enclosure to be conditioned require amelioration.

Another feature of the invention resides in the provision of means for accumulating condensate and gases, whereupon the gases will be purged from the system and part of the condensate delivered to the evaporator, the remainder of the condensate being used to augment a supply of condenser water.

Another feature covers the use of a reservoir and means in combination therewith for withdrawing liquid from the reservoir for condensing purposes and also for purging a condenser.

Another feature makes provision for an evaporator, a conditioning device and means for feeding a conditioning medium from the evaporator to the conditioning device only when the temperature of said medium is below a predetermined limit.

Another feature provides for controlling the circulation of fluid between an evaporator and an air conditioning unit, the control being dependent upon the temperature in the evaporator and the temperature within the enclosure to be conditioned.

Another feature provides for governing the temperature of an enclosure between predetermined temperature limits, yet assuring desired circulation of air regardless of degree of fluctuation of temperature in the enclosure.

Another feature covers the use of an ejector, means for supplying steam to said ejector whereby liquid in an evaporator may be cooled, and a condenser in combination with the evaporator, the flow of steam to the ejector, and hence, the operation of the evaporator being dependent upon the maintenance of desired pressures within the condenser. Further, the flow of steam to the ejector may also be under the control of means responsive to changes in temperature of condenser.

Further objects and features providing advantages in construction and assembly of applicant's system, as well as making for efficiency and economy in the operation thereof, will be more apparent from the following detailed description of one form of the invention, applied to a railroad car, to be read in connection with the accompanying illustrative drawings, in which.

Figure 1:
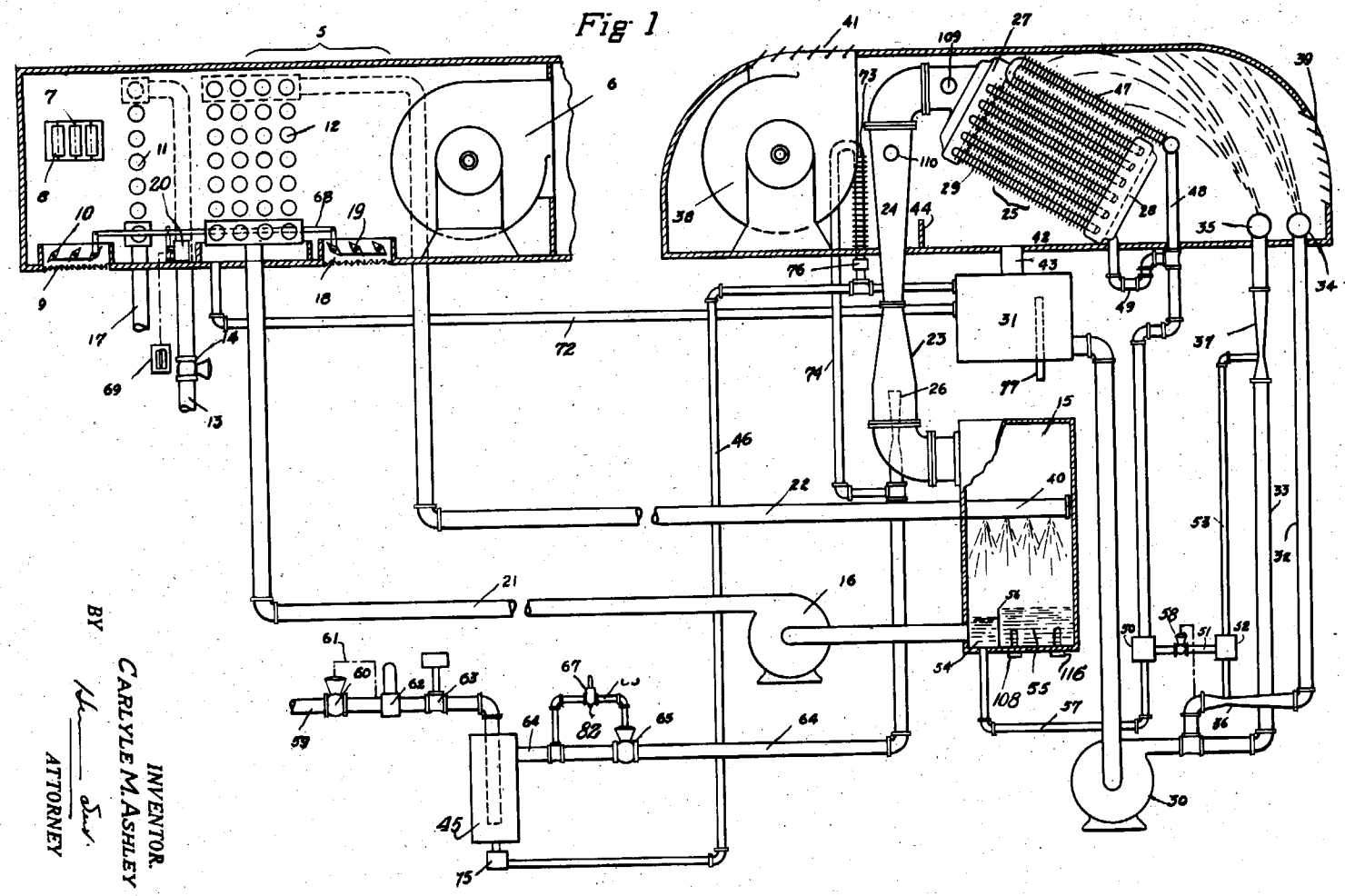
Fig. 1 is a schematic drawing, partly in section, of a system incorporating the invention.

Considering the drawings, similar designations referring to similar parts, numeral 5 represents, generally, an air conditioning unit forming part of a complete system of air conditioning. As illustrated, it is adapted to be mounted within the upper area of a railroad car adjacent to and between the upper deck and the half deck. The unit equipment includes a fan 6 which draws outside air through an intake opening 7, the free area of which may be variably controlled by dampers 8. In addition to drawing outside air, the fan may also draw return air from the interior of the car through openings 9 under the control of dampers 10. The outside air or mixture of outside and return air passes through a series of heating coils 11, which are normally operated under winter conditions, and through a series of cooling coils 12 which are normally operated under summer conditions, before entering fan 6 for distribution within the car interior. Under summer conditions, with which this invention is primarily concerned, the air passing through cooling coils 12 will have its temperature lowered to a predetermined dewpoint and, in general, will leave the cooling coils in cold, saturated condition. For purposes of raising the dry bulb temperature and lowering the relative humidity of this cold, conditioned air, a volume of bypassed air from the interior of the car may be admitted through openings 18 under control of dampers 19. This bypassed air, in practice, will mix with and augment the volume of conditioned air, so that a final mixture, adequate for circulation requirements, and at a comfortable temperature and relative humidity, will be discharged by fan 6 to a series of ducts and outlets serving the enclosure to be conditioned. Dampers 10 and 19 are preferably interconnected by link mechanism 68 under control of damper motor 20. This damper motor will operate the link mechanism responsive to a control instrument such as a thermostat 69, positioned within the conditioned area. Thus, when the temperature in the conditioned area rose above a predetermined limit, the thermostat would cause the damper motor to operate, whereupon more air would be admitted through dampers 10 and less through dampers 19. As a result, a greater volume of air would be dehumidified and less bypassed air utilized for reheating purposes. On the other hand, if the temperature in the enclosure required more heat in order to maintain desired conditions, dampers 10 would tend to close and dampers 19 tend to open, whereupon, less air would be conditioned and more bypassed, to supply greater reheating effect. Dampers 10 and 19, as illustrated, are differentially connected, so that when one series tends to close, the other tends to open.

Under winter operating conditions, or whenever it is desired to use heating coils 11, steam may be admitted through pipe 13 under control of valve 14 which may be suitably regulated by a thermostatic device not shown, in the usual manner. Drain pipe 17 removes condensate from the heater for disposition as may be desired. As under summer operating conditions, outside air, or a combination of outside and return air, will pass through the heater coils and raise to a desired high temperature. Bypassed air may then be employed to augment the volume of intensely heated air and modify its condition prior to discharge by the fan within the car interior.

Cooling coils 12 are supplied with a cooling fluid, ordinarily cold water, by pump 16 from a source of supply within evaporator 15 forming part of a system of refrigeration hereinafter more fully described. Supply line 21 feeds the cold water to the coils which is returned to the evaporator through line 22, and discharged therewithin preferably in the form of spray, after having removed heat from air passing over the coils.

In carrying on a refrigerating process, it is generally considered essential to employ (1) a medium which will be vaporized by the absorption of heat, then compressed, and finally condensed, thereby giving up the absorbed heat; (2) a source of power for the purpose of compressing the vapor, and (3) a second medium for removing and dissipating the heat absorbed by the first medium. In contrast to the accepted form of devices for carrying out such a refrigeration cycle, the present invention provides an arrangement which uses the same agency for all three purposes, namely, water in liquid and vaporous form.

Evaporator 15 has an outlet, as illustrated, in communication with converging nozzle 23, joining diverging nozzle 24, connecting by suitable fittings to condensing device 25. The elements 23 and 24 may be generally designated as a diffuser. In the head of converging nozzle 23 is suitably positioned a nozzle 26. The combination of the diffuser and nozzle 26 is generally termed an ejector. In operation, a fluid, such as steam, will be supplied to the nozzle 26 and expanded therein to a predetermined pressure which, for example, in practice, may correspond to the boiling point of water at 45° F. Lowering the pressure at the discharge of nozzle 26 will cause the pressure within evaporator 15 to be lowered, and consequently, the water will boil or evaporate. This action will result in absorption of the latent heat of evaporation necessary to carry on such boiling action, from the remaining water in the evaporator, thereby cooling it. To aid the evaporation action, liquid is returned to the evaporator, as already noted, and, as illustrated, in the form of spray, thereby providing a maximum area of liquid surface and evaporation. The liquid is discharged within the evaporator, preferably through spray header 40, and suitable nozzles may be provided for creating desired vaporizer or atomizer action, so that maximum evaporation, and hence, maximum cooling effect, may be accomplished, since the temperature of all spray droplets in their course to the reservoir 54 at the bottom of the evaporator, is substantially the same. The water vapor resulting from the boiling action will be removed from the evaporator 15 due to the operation of high velocity ejector 26. In effect, the steam expanded in the nozzle will produce an area surrounding the nozzle at lower pressure than that in the evaporator, resulting in a flow of vapor from the evaporator which is entrained by the steam and passes into diverging throat 24. As illustrated, throat or nozzle 24 increases in area as it approaches condenser 25, hence, the pressure of the steam and vapor passing through will be increased with a corresponding increase in saturation temperature. The compressed mixture then passes into condenser 25. This may be cooled in any desired manner, and, in the system illustrated, a special arrangement is employed combining a cooling tower with the condenser, for the purpose of liquefying the mixture of steam and vapor fed to the condenser from the diffuser. The condenser 25 comprises inlet header 27 and outlet header 28, connected by a series of tubes 29. The tubes are preferably provided with finned or other extended surface to promote increased heat transfer.

To remove the heat of condensation, pump 30 withdraws water from storage tatnk 31 which is then fed through pipes 32 and 33 to spray headers 34 and 35 and then discharged over the surface of the condenser. Aspirators 36 and 37, provided respectively in pipe lines 32 and 33, will be hereinafter described. Fan 38 draws air from outside the car through opening 39 and discharges it through opening 41. The air will absorb some of the spray water, causing a reduction in temperature of the air and water. The contacting of the water and air with tubes 29 causes the desired condensing action. Opening 41 is provided with a series of dampers arranged to permit the discharge of air therethrough whenever the fan is in operation; but when the fan is inoperative, and no air pressure is exerted against the dampers, they will fall back into closed position and prevent rain, cinders or other foreign matter from entering. Such condensing water as is not evaporated and falls into the condenser well or pan 42 will drain through outlet 43 into a storage tank 31. Partition 44 defines the extremity of the condenser well and prevents water entering the fan compartment.

In connection with replenishing the water supply of storage tank 31, it should be remembered that this system was primarily designed to be incorporated in a railroad car. It would be entirely possible to place a tank on the car large enough to carry sufficient water for make-up purposes. However, economy of weight and space are of prime importance. Applicant provides a novel system whereby all the water needed for continuous operation of the system is obtained from the steam supplied to the system. Not only does the steam supply requisite energy for compression, but it further supplies the refrigerant and the necessary condenser water.

From the bottom of the separator 45, a pipe 46 leads to the tank 31. Hence, any water which is separated from the steam in the trap will be forced through pipe 46 (by steam pressure) into tank 31. To prevent live steam from blowing into tank 31, a thermostatic trap 75 is placed in the line 46. The trap 75 is of the type in which a thermostatic element controls the opening and closing of a valve. The thermostat is so arranged that as long as there is condensate in 45, the valve will remain open, but as soon as steam strikes the thermostat, the valve will close.

A second source of make-up water is the steam utilized by nozzle 26. This steam, with the vapor from 15 is condensed in 25 and a portion corresponding to the steam supplied through 26 is removed from the system and discharged into the condenser water system in a manner to be hereinafter described.

During the summer season, it is apparent that considerable quantities of water will be condensed from the air passing over cooling coils 12. This condensate, through the pipe 72, is drained into tank 31 as an additional source of make-up water.

Any deficiency in condenser water not taken care of from the above sources is made up from an auxiliary condenser. The condenser comprises a piece of tubing 73, preferably finned to increase its heat radiating surface, mounted between the condenser 25 and the fan 38. It is of importance that 73 is separated from the condenser 25 so that the heat from 73 will not affect the action of condenser 25. The tubing 73 is supplied with live steam from pipe 64 through pipe 74. A thermostatic trap 76, similar to trap 75, previously described, joins the end of 73 to the line 46 leading to tank 31. Obviously, when steam is supplied to nozzle 26, it will be simultaneously supplied to the tubing 73. Air flowing over the tube will cause condensation in 73 which condensate will be delivered through trap 76 to the tank 31.

The quantities of water which are drawn from the various sources are of a varying nature. For example, under some operating conditions, the water from 45 added to the water from the condenser 25 would be sufficient to supply all make-up requirements. However, under other conditions, all the water available from the condenser 25, from separator 45, condensate from coils 12, plus the steam condensed in the auxiliary condenser 73 is required. Since the supply and demand is so variable, an overflow pipe 77 is provided in tank 31 to prevent flooding.

It is apparent that by utilizing condensed steam throughout the system, troubles due to boiler scale are avoided. Except in rare cases, the water used in the locomotive is soft water naturally or by artificial means. Further, the water used in the cooling tower is, in effect, distilled water. Hence, the occurrence of troublesome boiler scale is avoided.

The system operates at a high vacuum, and in order to assure effective condenser action, provision is made for purging. Air which will be brought in by the steam and any other air which may leak in will tend to collect in the upper tubes and discharge header 28 of the condenser 25. Upper tube 47 connects with the uppermost part of discharge header 28 where air and other gases to be purged normally collect. Tube 47 connects with air discharge pipe 48. The condensate in the bottom of discharge header 28 is led through trap 49 and joins pipe 46. The air and water then proceed to separating chamber 50 which separates and returns part of the water to the evaporator in a manner hereinafter described. The remainder of the water and air are drawn through pipe 51 by the combined action of the aspirators 36 and 37 in communication therewith to a second separator 52. The water and some air then passes into the aspirator 36 and is discharged with the condenser water through pipe 32 and spray header 34. The air is drawn through pipe 53 into aspirator 37 and is similarly discharged with condenser water through spray header 35. Pump 30, as already described, supplies water from tank 31 to pipes 32 and 33, and the water quantities are adequate to make effective the aspirator action. The system is, therefore, continually purged as long as its operation is carried on.

Separator 50 may take the simple form of a T-connection joining pipe 51 with the condenser leg of U-shaped trap 57. This connection may be placed at any point above the normal liquid level in the condenser leg of trap 57, so that there is always a vapor connection between the separator and the condenser.

The condenser is preferably mounted in an angular position, tilted in two directions, as shown in Fig. 1. This is important, because in train operation, as when proceeding around a curve, or upgrade, the condenser might otherwise be tilted to prevent gravity drain. By mounting the condenser at an angle in the manner illustrated, the position of the low point of the condenser will remain substantially the same at all times and assure drainage without interruption despite change in level of the car during ascent, descent, or operation around curves.

Some of the water collected in separating chamber 50 is returned to the evaporator through U connection 57, for the purpose of maintaining an adequate supply of water in the evaporator, whenever diminution resulting from evaporation lowers the level beyond a predetermined minimum. The evaporator is divided into chambers 54 and 55 by a weir 56. The chamber 55 serves as a reservoir for collecting water and surface evaporation therefrom is continually carried on during the operation of the evaporator. The U connection 57 discharges into chamber 54. Due to the fact that water is constantly being evaporated from evaporator 15, it is obvious that in time there will be no overflow from chamber 55 into 54. Since water is continually being withdrawn in constant volume from chamber 54 by pump 16, the level in chamber 54 will fall. The U connection is so designed that a certain height of water in chamber 54 plus the height of water in the evaporator leg of trap 57, plus the evaporator pressure will balance the condenser pressure plus the pressure of a certain height of water in the condenser leg of trap 57. As the height of water in 54 decreases, water will flow through the U connection from separator 50 to chamber 54 until the level in 54 rises to a point sufficient again to equalize the pressures. Thus, the supply of water in evaporator 15 is automatically replenished, depending upon the rate of evaporation therein.

While the reservoir portion of the evaporator is shown divided into two chambers, it is obvious that only one chamber may be provided. Applicant prefers to divide the evaporator into two chambers to provide a storage of cold water which may be utilized for some time after the ejector action has been discontinued.

To prevent air from forcing its way through the spray headers and aspirators back into the system, when pump 30 is not operating, valve 58 is provided in the pipe 51. This valve is of the type which is normally held closed by a spring and which opens in response to pressure exerted on a diaphragm, or bellows, operatively connected to the valve. Thus, the diaphragm of valve 58 acts responsive to the flow of water through aspirator 36, as indicated by the broken line connecting the two, so that when pump 30 operates, the resulting pressure will open 58, but when the pump stops, the valve simultaneously closes under the action of a spring. It is apparent that an electrically operated valve or some type of check valve might be substituted for 58. Applicant prefers the arrangement shown because it is positive, simple and inexpensive.

Figure 3:
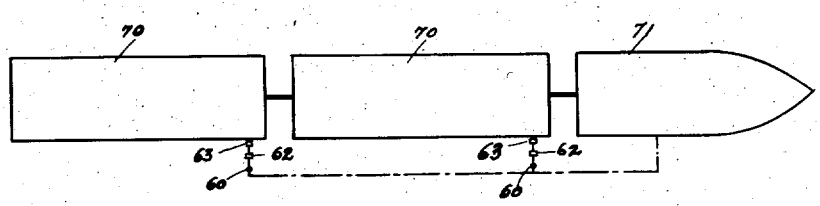
Fig. 3 is a representation of a series of passenger cars, each equipped with a steam ejector system of car conditioning, served by a common source of steam.

For operating the system, a supply of steam is provided from a suitable source. In train operation, steam may be supplied from a locomotive or central station and fed, preferably, through supply lines commonly used for supplying steam for winter heating, to the various cars equipped with air conditioning systems. Where single units are employed, a boiler or other generating means may be combined with the system, but, in the car arrangement illustrated, wherein a plurality of air conditioning systems are employed, each of the cars 70, as shown in Fig. 3, obtains its steam supply from the common source or locomotive boiler 71. Steam enters pipe 59, which is suitably connected to a supply line leading from the locomotive. The steam then passes through regulating valve 60, blowoff valve 62 and pressure switch 63 before entering steam separator 45. The valve 60 is of the diaphragm type, operative responsive to steam pressure, as shown by dotted line 61, and adapted to reduce the pressure of incoming steam to a predetermined point. Thus, steam may be supplied at pressures very much greater than that desired and valve 60 will tend to maintain the pressure entering the system at a constant value. If the pressure is above said value, the valve will tend to close, whereas, if it falls below a certain value, it will allow the passage of steam at full pressure. Safety valve 62 operates in the usual manner, and will blow off if for any reason steam enters beyond valve 60 above a desired pressure. Pressure switch 63 operated responsive to steam pressure changes whereby a drop in steam pressure below a predetermined minimum causes the switch to function to cut off the supply of steam and make inoperative the refrigeration apparatus. When the steam pressure again rises to a desired point, it will function to admit steam and if refrigeration is then desired, the apparatus will again become operative.

Steam separator 45 removes entrained water from the steam in the usual manner, thereby allowing only dry and saturated steam to proceed to ejector nozzle 26. Pipe 64 conveys the steam from separator 45 to nozzle 26, under control of valve 65. This valve is of the type in which a diaphragm operates the closure member in response to pressure exerted thereon. Further, the diaphragm is so constructed that at predetermined pressure, it will operate with a quick or "snap" action. That is, the valve, normally held closed by a spring, is adapted to be opened when a predetermined fluid pressure is exerted on the diaphragm. The diaphragm of valve 65 is connected by means of conduit 66 to the pipe 64 at a point between valve 65 and separator 45. Pilot valve 67 is adapted, among other things, to operate under the control of pressure switch 63 to enable valve 65 to function. When the pressure of the entering steam falls below a predetermined minimum, the pressure switch 63 will cause pilot 67 to cut off the pressure against the diaphragm of valve 65 and simultaneously open the pipe 66 to the atmosphere at 82, whereby steam trapped between valves 67 and 65 may escape, whereupon valve 65 will close and steam prevented from entering the system. When the steam pressure rises above the desired point, the pressure switch will cause pilot 67 to enable 65 to admit steam, provided the system is calling for refrigeration. More particularly, valve 67 is adapted to be opened or closed in response to the expansion or contraction of a fluid contained in a bellows. An electrical resistance 79 (Fig. 2) surrounds a portion of the bellows to supply heat thereto. When the circuit, including resistance 79 is closed, the bellows will expand, causing the valve closure member to leave its seat, thereby permitting steam to pass through the valve. When the circuit is broken, the bellows will contract, due to the cooling and contraction of the fluid therein, and the pressure of an associated spring will cause the closure member to assume a closed position against the seat. While an electrical arrangement is employed for causing pilot 67 to control valve 65, it is obvious that an air pressure system, for example, could be used with like effect to control valve 65.

The operation of the system depends upon the functioning of the components thereof, as individual units or systems of apparatus, and upon their cooperative interrelation responsive to any suitable system of control. Such control may be manual, partly automatic, or fully automatic. For purposes of illustration, the following description sets forth an illustrative method of operation under a control adapted for use in air conditioning an enclosure such as a railroad passenger car. It will be obvious that similar combinations of apparatus under analogous methods of control could be employed for other air conditioning and refrigeration purposes.

Figure 2:
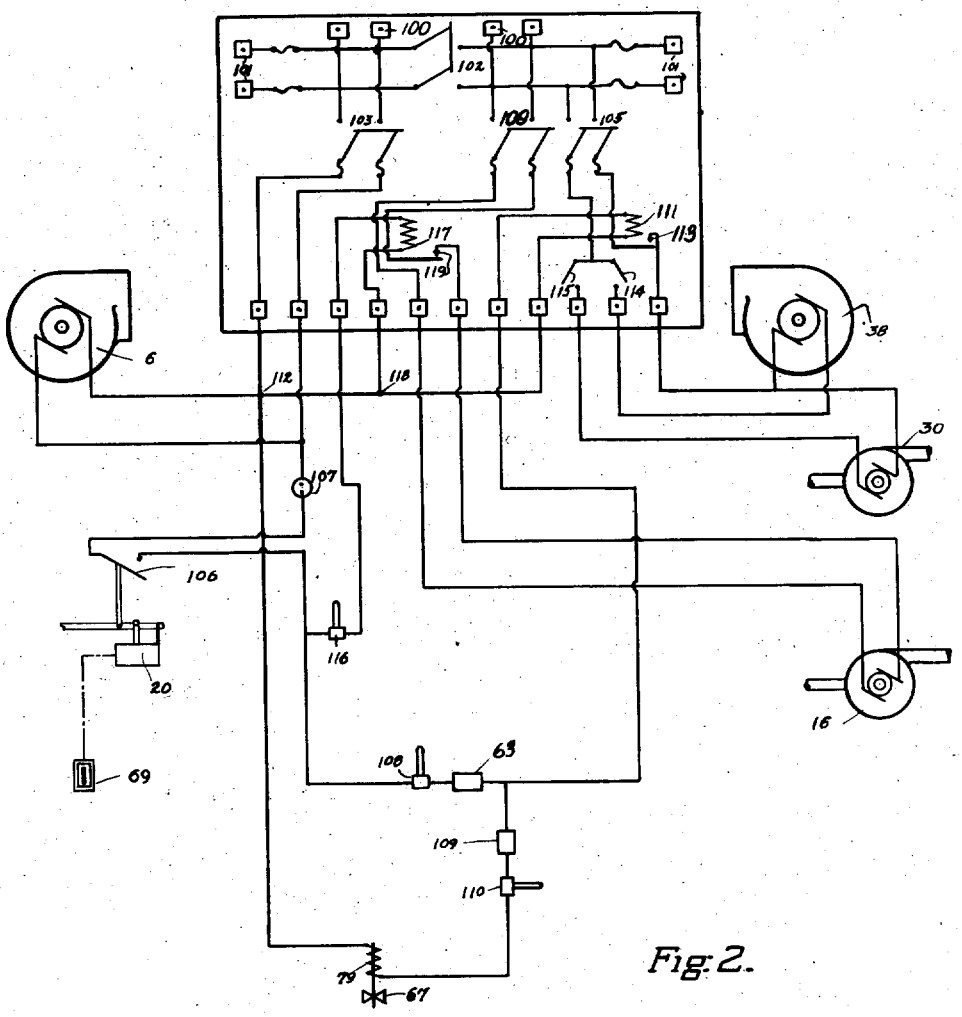
Fig. 2 is a diagrammatic control arrangement adapted to be applied to the assembly of apparatus illustrated in Fig. 1.

Fig. 2 shows an electrical control arrangement adapted to be employed in combination with the system of Fig. 1. Considering the control arrangement, binding posts 100 connect to a suitable source of generator current and binding posts 101 connect to a suitable battery source. Switch 102 enables connection to either of the battery or generator sources, and may interconnect the two. Switches 103, 104 and 105 connect respective circuits to various parts of the system, as will be hereinafter described.

Upon closing switch 103, a circuit will obviously be completed for operating air conditioning fan 6. It is always desirable to have fan 6 operating whenever the car enclosure is being occupied. A circulation of air is desirable regardless of the necessity for air cooling or conditioning. As a result, even if the air conditioning apparatus becomes inoperative, or when the cooling apparatus is closed down, as under winter conditions, a circulation of air will still be maintained. This air may be drawn from outdoors through dampers 8 or may be a combination of outdoor air and air from the enclosure admitted through dampers 10 and/or 19.

Assuming that the temperature in the enclosure is above a predetermined point, and air cooling and conditioning is desired, the system will be placed in operation provided it is ready to function safely and efficiently. Thus, thermostat 69, responsive to temperature changes in the enclosure, will first cause dampers 10 to open widely and dampers 19 to approach closed position. If the combination of fresh and return air is not sufficiently cool to lower the air temperature in the car, damper motor 20, under control of thermostat 69, will then close connection 106. Assuming that steam pressure in the pipe 59 is sufficiently high to close pressure switch 63, the following circuits will be completed. Switch 103, push button switch 107, which is closed by the conductor, in railroad operation, during the cooling and air conditioning season, connection 106 of damper motor 20, thermostat 108, located in the evaporator, pressure switch 63, winding of relay 111, terminal 112 and back to the switch.

The energization of the winding of relay 111 will cause its associated armature to be pulled up and make contact at 113, thereby closing the following circuits, assuming that hand switches 114 and 115 are in closed position. Switch 105, contact 113, motor of fan 38, serving the cooling tower, switch 114 and back to switch 105. The other circuit under control of the relay 111 follows a patch from switch 105 to contact 113, motor of condenser pump 30, switch 115 and back to switch 106.

The completion of this circuit places pump 30 in operation, whereupon the aspirators 36 and 37 operate to purge the condenser of any accumulated gases in a manner hereinbefore described. When the pressure in the condenser 25 has been reduced to a predetermined point (assuming that the system has been inoperative for some time), the pressure switch 109 will close, whereupon the following circuit will be completed: switch 103, push button switch 107, connection 106 of damper motor 20, thermostat 108 located in the evaporator, pressure switch 63, condenser pressure switch 109, thermostat 110 (in diffuser 24 or condenser 25), pilot valve 67 and back to switch 103.

Another circuit dependent upon the operation of damper motor 20 and the closing of connection 106 is as follows: switch 103, push button switch 107, connection 106, thermostat 116 in the evaporator, winding of relay 117, terminals 118 and 112, and back to switch 103.

The energization of the winding of relay 117 causes its associated armature to pull up, thereby making contact at 119 and completing a circuit for the air conditioning pump as follows: switch 104, contact 119, motor of the air conditioning pump 16 and back to switch 104.

It is evident, therefore, that the plurality of circuits hereinabove described controls the operation of the system so that it will give desired refrigeration service only when temperature conditions are within predetermined limits and then only if the various devices forming part of or appertaining to the system are in condition to function properly. Thus, by reference to the lower portion of Fig. 1, it may be noted that steam will not be admitted to ejector nozzle 26 unless certain prerequisites are met. First, it will be reduced to a desired pressure under control of valve 60. If valve 60 does not properly function, the pressure will still be lowered to the proper point by safety valve 62. Then, steam pressure switch 63 makes sure that the steam pressure is above the effective point sufficient to assure desired ejector action, and unless this pressure is above the prescribed point, pilot valve 67 will not open; consequently, steam valve 65 will remain closed.

Assuming, however that the steam pressure is below the blow-off point and above the minimum required for efficient ejector action, and assuming that pilot valve 67 is in condition to allow the passage of steam, the steam will pass through nozzle 26. The ejector action causes evaporation in evaporator 15 and the passage of steam will cause water vapor to be sucked from the evaporator and entrained and compressed by the steam. This mixture of steam and vapor then proceeds to the condenser, the ejector nozzle and diffuser being so designed that efficient transit is assured, with no sacrifice to maximum evaporative or cooling effect upon the water in the evaporator. The mixture of steam and vapor is then liquefied in the condenser, the liquid condensate draining to trap 49 and then to separator 50. As already pointed out, air and other gases will rise to the upper tube 47 of the condenser and also proceed with the condensate to separator 50. As already noted, some of the condensate will flow to the evaporator for make-up purposes, and the balance, plus the purged gases, will be drawn by the action of aspirators 36 and 37 to condenser water spray headers 35 and 34, and discharged upon the condenser with condenser water supplied by pump 30 from storage tank 31. The condenser water not evaporated during the condensing and cooling tower process will drain from condenser well 42 into storage tank 31, and the cycle will be repeated.

The cooled water in the evaporator is conveyed to cooling and dehumidification coils 12 by pump 16 and then returned to the evaporator in the simple cycle illustrated in Fig. 1. As already noted, outside air and/or return air will be cooled and dehumidified in passing over the cooling coils, and will then be discharged to the interior to be conditioned either alone or in combination with bypassed air. While the above is the normal method of operation during periods requiring cooling and conditioning, the control arrangement shown more particularly in Fig. 2 illustrates the manner in which such operation is brought about and regulated. Thus, in starting the system, push button switch 107 is first set in closed position. It will usually be retained in closed position during the whole of the cooling season. Assuming then that thermostat 60 is calling for a cooler temperature and has operated the damper motor 20 to close connection 106, the cooling tower fan 38 and condenser pump 30 will be placed in operation responsive to completion of their respective circuits hereinbefore described. Included in this circuit is thermostat 108, located within evaporator 15, which will maintain a closed connection so long as the temperature of the cooling water in the evaporator is above a predetermined temperature. If the cooling water falls below the predetermined point, say 40° F., the thermostat will operate to break the electrical connection and hence, open the circuit. Further, pressure switch 63 is also included in the said circuit arrangement and will not allow the circuit to be completed unless steam at or above a minimum desired pressure is available.

The energization of relay 111 is dependent upon closure of the connections under control of thermostat 108 and pressure switch 63, so that as soon as the relay becomes energized, the cooling tower fan and the condenser pump will start to operate and purging operations will immediately commence to clear the system. The fan will not be cut in unless hand switch 115 is in closed position and need not be cut in until the system is sufficiently purged. As soon as the condenser pressure has been reduced below a predetermined maximum, condenser pressure switch 109 will operate to close electrical contacts controlled thereby as will thermostat 110 located in diffuser 24, if the temperature of condenser is below a predetermined maximum. If desired, thermostat 110 may be located in the condenser well.

Pilot valve 67 is directly under control of thermostat 108 in the evaporator, pressure switch 63, pressure switch 109 in the condenser, and thermostat 110 in the diffuser.

If the temperature and pressure in the condenser are within desired predetermined limits, the pilot valve 67 will allow valve 65 to admit steam to the system, whereas, if one of these instruments records unfavorable conditions, the pilot valve will cause valve 65 to cut off the steam and make the system inoperative.

The air conditioner pump for circulating cooling water from the evaporator 15 to the cooling coils 12 is under primary control of the circuit whose completion is dependent upon the energization of relay 117. This relay will be caused to energize only when thermostat 116 in the evaporator records a temperature below a predetermined maximum. Obviously, it is not desirable to permit the circulation of warm water. It is only when the water temperature is below a certain point that cooling could be carried on and hence, thermostat 116 will break the circuit when the temperature rises above a desired level, but will permit circulation to be carried on as long as the temperature is favorable to cooling.

The circuits are closely interrelated, so that a fault affecting one of them will influence the action of the others. For example, should fan 38 become inoperative, the temperature of the condenser water would soon rise to an undesirable level. Thermostat 110 would then respond to break the circuit, including pilot valve 67 and steam would be cut off, thus making the system inoperative. As a result, the ejector action would cease and the temperature in the evaporator quickly rise, especially under summer conditions, so that thermostat 116 would respond and break the circuit for the air conditioner pump, thereby preventing circulation of hot water to the cooler, and preventing unduly heating up the water of the evaporator. If the fault were repaired, and the system restarted, the ejector action would be carried on with the air conditioner pump inoperative until the water was cooled to a sufficient degree, and then only would thermostat 116 complete the circuit for the air conditioner pump and allow circulation of cooling water.

Assuming, further, that the condenser pump became inoperative, the pressure in the condenser would soon cause switch 109 to break the circuit including pilot valve, and thus cut off steam from the system. So also, if the condenser water fed by the pump rose to an abnormal level, due to any cause, condenser thermostat 110 would break the circuit and cause pilot 67 to cut off the steam from the system. Assuming the air conditioner pump broke down, the temperature of the water in the evaporator would tend to fall below the predetermined low limit, whereupon thermostat 108 would break all circuits except that for the air conditioner fan, and steam would be cut off from the system, as well as cooling tower fan and condenser pump become inoperative.

Of course, if the temperature in the enclosure fell below the desired level, thermostat 69 would cause motor 20 to break connection 106, whereupon all of the circuits, with the exception of the air conditioner fan circuit, would be broken and the system become wholly inoperative. It is of note that if the temperature in the enclosure still remained below the desired limit, the thermostat would cause dampers 10 to close and damper 19 to open, so that a maximum of air would be bypassed and a minimum sent through the coils which might still be sufficiently cold to cause cooling. It is manifest that space requirements in a railroad car, for example, are exceedingly exacting in that it is highly desirable to retain the orthodox interior appearance of the car and utilize a minimum of useful space in the passenger and service areas. As a result, the combined condenser and cooling tower arrangement, including the cooling tower fan, is positioned in the upper area of the car adjacent the roof with air inlet and outlet so arranged that the installation is neither noticeable nor detracts from the utility of the floor or passenger accommodation areas. So also, the combination of heating coils, cooling coils, dampers and air conditioning fan may be positioned at one end of the car in an upper area thereof adjacent the roof and will similarly be out of the way and not affect the conventional appearance of the car interior. The evaporator, pumps and diffuser may be suitably arranged in the upper deck area of the car or may be suitably positioned in one of the service or lavatory spaces. If desired, some of the equipment, such as the pumps and motors therefor, may be installed beneath the car.

No reservation is made as to the arrangement of the parts, their interconnection, or their method of operation, application, or interrelation.

Since certain changes in carrying out the above process and in the constructions set forth, which embody the invention, may be made without departing from its scope, it is intended that all matter contained in the above description or shown in the accompanying drawings shall be interpreted as illustrative and not in a limiting sense.

Having described my invention, what I claim as new and desire to secure by Letters Patent of the United States is:

1. In a system of the character described, an evaporator, a condenser, steam ejector apparatus for lowering the pressure in the evaporator, said steam ejector apparatus discharging within the condenser, the condenser normally operating at sub-atmospheric pressure, means for removing condensate from the condenser, means for feeding a portion of the condensate to the evaporator and another portion of the condensate to a circuit supplying liquid at atmospheric pressure over the outer surfaces of the condenser, and means for passing air in contact with the outer surfaces of the condenser whereby vapors therewithin are evaporatively condensed.

2. In a system of the character described, an evaporator, a condenser, said evaporator and condenser normally operating at pressures below atmospheric, a circulating system for discharging liquid over the surfaces of said condenser, a first passageway for conveying fluid from said condenser to said evaporator, a second passageway for conveying fluid from said first passageway to said circulating system, and means operative responsive to the cessation of flow of liquid in said circulating system for closing said second passageway.

3. In an air conditioning system, an air conditioning unit, an evaporator serving the unit, a regulating device operative responsive to temperature changes in the evaporator, a second regulating device operative responsive to changes in temperature within the area served by the air conditioning unit, and a pump under control of said devices, said pump being operative to supply a cold fluid from said evaporator to said unit only when the temperature in the evaporator is below a desired value, and the temperature within the area served by the unit is above a desired value.

4. In an air conditioning system, means for supplying a fluid to an ejector, an evaporator in combination with the ejector, a condenser for receiving said fluid from the ejector and vapor from the evaporator, a regulating device operative responsive to changes in pressure within the evaporator, another regulating device operative responsive to temperature changes in the condenser, means operative responsive to said regulating devices for controlling the flow of fluid to the ejector, said last means being arranged to operate only when the pressure in the evaporator and the temperature in the condenser are below desired values.

5. In combination with a railroad car, a source of steam, an evaporator, an ejector communicating with said evaporator, means for supplying steam from said source to the ejector, means for controlling the pressure of steam supplied to the ejector responsive to changes in pressure of steam supplied from said source, and means for cutting off the steam to the ejector when the pressure falls below a predetermined point.

6. In a system of the character described, an evaporator, a condenser, a steam ejector between said evaporator and condenser, means for discharging liquid over the outer surfaces of said condenser, a first passageway for conveying liquid from said condenser to said evaporator, a second passageway between said means and said first passageway, and means for closing said second passageway whenever said first-mentioned means is inoperative.

7. In a system of the character described, an evaporator, a condenser, a steam ejector between said evaporator and said condenser, a circulating system for discharging liquid over the outer surfaces of said condenser, a water ejector in said circulating system, a first passageway for conveying liquid from said condenser to said evaporator, a second passageway for conveying liquid from said first passageway to said water ejector, and means operative responsive to the cessation of liquid flow in said circulating system for closing said second passageway.

8. In a system of the character described, an evaporator, a condenser, a steam ejector between said evaporator and said condenser, a circulating system for discharging liquid over the outer surfaces of said condenser, thereby to effect a condensation of vapors therein, a separating chamber, a passageway for conveying condensate and non-condensable gases from said condenser to said chamber, means for supplying a portion of condensate from said chamber to said evaporator, and means for supplying the remaining portion of said liquid and said non-condensable gases from said chambers to said circulating system.

9. In a system of the character described, an evaporator, a conductor, a steam ejector interposed between said evaporator and said condenser, a circulating system for discharging liquid over the outer surfaces of said condenser, thereby to effect a condensation of vapors therein, a separating chamber, means for conveying condensate and non-condensable gases from said condenser to said chamber, a trap between said chamber and said evaporator for supplying liquid to said evaporator in response to changes in liquid level therein, and means operative responsive to the flow of liquid in said circulating system for withdrawing liquid and non-condensable gases from said chamber, said withdrawn liquid being utilized to augment the liquid discharged over the surfaces of said condenser.

10. In a system of the character described, an evaporator, a condenser, a steam ejector interposed between said evaporator and said condenser, a circulating system for discharging liquid over the outer surfaces of said condenser to effect a condensation of vapors therein, a separating chamber, means for conveying liquid and non-condensable gases from said condenser to said chamber, means for supplying a portion of liquid from said chamber to said evaporator, a water ejector in said circulating system, a passageway communicating with said chamber and said ejector, and means operative responsive to a cessation of liquid flow in said circulating system for closing said passageway.

11. In a system of air conditioning a source of steam, an evaporator, an ejector, means providing communication between said ejector and said source of steam for supplying steam from said source to said ejector, means providing communication between said evaporator and said ejector, means for controlling the pressure of steam supplied to the ejector responsive to changes in pressure of steam supplied from said source, and means for interrupting the supply of steam to the ejector when the steam pressure of said source falls below a predetermined point.

12. In a system of the character described, an evaporator, a condenser, a steam ejector interposed between said evaporator and said condenser, a source of steam serving said ejector, a circulating system for discharging liquid over the outer surfaces of said condenser to effect a condensation of vapors therein, and means including a second condenser for condensing steam from said source and for supplying the resultant condensate to said circulating system.

13. In a system of the character described, an evaporator, a condenser, a steam ejector interposed between said evaporator and said condenser, a source of steam, a circulating system for discharging liquid over the outer surfaces of said condenser to effect a condensation of vapors therein, means for supplying to said evaporator a portion of the condensate, means for supplying to said circulating system another portion of the condensate, and means including another condenser for condensing steam from said source and for supplying the resultant condensate to said circulating system.

14. In a system of the character described, an evaporator, a first condenser, a steam ejector interposed between said evaporator and said condenser, a source of steam serving said ejector, a circulating system for discharging liquid over the outer surfaces of said condenser to effect a condensation of vapors therein, and means including a second condenser for condensing steam from said source and for supplying the resultant condensate to said circulating system, and means for supplying to said circulating system moisture evaporated in said evaporator and condensed in said first condenser.

15. In a system of the character described, an evaporator, a condenser, a steam ejector interposed between said evaporator and said condenser, a source of steam serving said ejector, a circulating system for discharging liquid over the outer surfaces of said condenser to effect a condensation of vapors therein, and means including a second condenser for condensing steam from said source and for supplying at least a portion of the resultant condensate to the outer surfaces of said first-mentioned condenser.

16. In a refrigerating system including a condenser, a source of steam, means for utilizing steam from said source for operating said refrigerating system, means including an auxiliary condenser for condensing steam and for utilizing at least a portion of the resultant condensate in removing heat from said first-mentioned condenser.

17. In an apparatus of the character described, an evaporator, a condenser, a steam ejector disposed between and connecting said evaporator and said condenser, a liquid circulating system for supplying liquid to the outer surfaces of said condenser, and means including a second ejector in said circulating system for withdrawing condensate condensed in said condenser and for supplying said withdrawn condensate to said circulating system.

18. In an apparatus of the character described, including an evaporator, a condenser, and a steam ejector interposed between said evaporator and said condenser; the combination of a liquid circulating system adapted to supply liquid to said condenser for heat exchange with vapors to be condensed therein, means for forcibly circulating liquid through said circulating system, an ejector interposed in said circulating system, and means including a liquid supply line communicating with the throat of said ejector for supplying to said circulating system at least a portion of the fluid condensed in said condenser.

19. In a system of the character described an evaporator, a condenser, a steam ejector interposed between said evaporator and said condenser, a cooler operatively associated with said evaporator, means for passing air through said cooler to reduce the temperature of the air below its dewpoint whereby condensate is formed, a circulating system for discharging liquid over the outer surfaces of said condenser to effect a condensation of vapors therein to form other condensate, means for apportioning said other condensate so that a required portion is supplied to said evaporator and the remainder thereof supplied to said circulating system and means for supplying said condensate from the cooler to said circulating system.

20. In a steam jet refrigerating system including a condenser and an evaporator, a source of steam, means for utilizing steam from said source for reducing the pressure in said evaporator, a water circulating system for condensing steam in said condenser, means for supplying the resultant condensate to a pair of conduits, means in combination with a first of said conduits for utilizing a portion of the condensate for removing heat from said condenser and means in combination with the other of said conduits for supplying another portion of said condensate to said evaporator, an air cooling means operatively associated with said evaporator for dehumidifying air whereby condensate is formed and means for supplying said last mentioned condensate to one of said conduits.

CARLYLE M. ASHLEY.